(12) United States Patent
Usami (10) Patent No.: US 10,773,445 B2
(45) Date of Patent: Sep. 15, 2020

(54) MOLD, BLOW MOLDING APPARATUS, AND BLOW MOLDING METHOD

(71) Applicant: NISSEI ASB MACHINE CO., LTD., Nagano (JP)

(72) Inventor: Masayuki Usami, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 254 days.

(21) Appl. No.: 15/771,789

(22) PCT Filed: Oct. 27, 2016

(86) PCT No.: PCT/JP2016/081968
§ 371 (c)(1),
(2) Date: Apr. 27, 2018

(87) PCT Pub. No.: WO2017/073699
PCT Pub. Date: May 4, 2017

(65) Prior Publication Data
US 2018/0304519 A1 Oct. 25, 2018

(30) Foreign Application Priority Data
Oct. 28, 2015 (JP) .................................. 2015-211770

(51) Int. Cl.
*B29C 49/48* (2006.01)
*B29C 49/30* (2006.01)
(Continued)

(52) U.S. Cl.
CPC .......... *B29C 49/30* (2013.01); *B29C 49/0005* (2013.01); *B29C 49/06* (2013.01);
(Continued)

(58) Field of Classification Search
CPC ............................................. B29C 2049/4807
See application file for complete search history.

(56) References Cited

U.S. PATENT DOCUMENTS

2007/0026098 A1 2/2007 Lemaistre et al.
2008/0124424 A1 5/2008 Mie et al.

FOREIGN PATENT DOCUMENTS

CN A-1822934 8/2006
CN A-1826266 8/2006
(Continued)

OTHER PUBLICATIONS

Partial machine translation of JP 11-314268 A dated Nov. 1999 obtained from the espace website. (Year: 1999).*
(Continued)

*Primary Examiner* — Robert B Davis
(74) *Attorney, Agent, or Firm* — Finnegan, Henderson, Farabow, Garrett & Dunner, L.L.P.

(57) ABSTRACT

A mold includes a link member including a protruding grip forming part configured to form a grip part to a portion of a container by pressurizing a portion of a preform that is expanded during blow molding; and a piston member configured to move forward toward a cavity to thus press and rotate the link member. The grip forming part has: a pressurizing surface configured to pressurize the portion of the preform; and a contact surface configured to come into contact with the piston member, wherein the piston member has a pressing surface that comes into contact with the contact surface and presses the grip forming part toward an inside of the cavity when moving the pressurizing surface, and wherein the pressurizing surface is arranged at an opposite side of the contact surface of the grip forming part with respect to a moving direction of the piston member.

4 Claims, 8 Drawing Sheets

(51) Int. Cl.
  *B29C 49/00* (2006.01)
  *B29C 49/06* (2006.01)
  *B29L 31/46* (2006.01)
  *B29L 31/00* (2006.01)
  *B29C 49/42* (2006.01)
  *B29C 49/64* (2006.01)

(52) U.S. Cl.
  CPC .......... *B29C 49/48* (2013.01); *B29C 49/4205* (2013.01); *B29C 49/6427* (2013.01); *B29C 2049/4807* (2013.01); *B29L 2031/463* (2013.01); *B29L 2031/7158* (2013.01)

(56) References Cited

FOREIGN PATENT DOCUMENTS

| CN | C-100594115 | | 3/2010 | | |
|---|---|---|---|---|---|
| DE | 19627805 A1 | * | 2/1997 | ............. | B29C 49/38 |
| EP | A2-1616688 | | 1/2006 | | |
| FR | 1503960 A | * | 12/1967 | ......... | B29C 49/4802 |
| JP | 11-314268 A | | 11/1999 | | |
| JP | 11314268 A | * | 11/1999 | ............. | B29C 49/54 |
| JP | 2000-246790 A | | 9/2000 | | |
| JP | 2007-153366 A | | 6/2007 | | |
| WO | WO 2007/082051 A1 | | 7/2007 | | |
| WO | WO 2010/015219 A2 | | 2/2010 | | |

OTHER PUBLICATIONS

Supplementary European Search Report issued in counterpart European Application No. 16859928.0, dated Apr. 10, 2019.
English-language International Search Report issued by the Japan Patent Office in International Application No. PCT/JP2016/081968, dated Dec. 6, 2016.
First Chinese Office Action Issued by the State Intellectual Property Office of People's Republic of China in corresponding Chinese Application No. 201680063749.8, dated Sep. 4, 2019 (11 pages).

* cited by examiner

MOLD, BLOW MOLDING APPARATUS, AND BLOW MOLDING METHOD

This application is a national phase of International Application No. PCT/JP2016/081968, titled "Mold, Blow Molding Apparatus, And Blow Molding Method", filed on Oct. 27, 2016, which claims the benefit of priority to Japanese Patent Application No. 2015-211770, filed in the Japan Patent Office on Oct. 28, 2015, the entire content of which are incorporated herein by reference.

TECHNICAL FIELD

The present invention relates to a d of a resin container, a blow molding apparatus, and a blow molding method.

BACKGROUND ART

In order to store and transport seasonings, beverages, alcoholic liquors and the like, resin containers are frequently used. A large capacity container has a large body diameter, so that it is difficult to grip the container with one hand. For this reason, in some cases, a body part of the container is formed with a grip part during blow molding.

Patent Document 1 discloses a mold for blow molding, in which one end of a link member is provided with a protrusion for forming a grip part and another end of the link member is provided with a drive mechanism for rotating the link member with a shaft part being interposed therebetween.

CITATION LIST

Patent Document

Patent Document 1: WO 2010/015219 A2

SUMMARY OF INVENTION

Problems to Be Solved

However, according to the apparatus disclosed in Patent Document 1, during the blow molding, a force of blow air for expanding a preform is applied to the protrusion provided to one end of the link member, and a force for rotating the link member is applied to the other end of the link member with the shaft part being interposed therebetween. In this configuration, defects such as damage or failure is likely to occur to the link member and the shaft part thereof during the blow molding.

It is therefore an object of the present invention to provide a mold, a blow molding apparatus, and a blow molding method, in which a damage or a failure is difficult to occur.

Means for Solving the Problems in order to achieve the object, a mold of the present invention is a mold for manufacturing a resin container having a grip part by inserting a bottomed tubular preform into a cavity and performing blow molding, the mold including:

a link member configured to be rotatable about a shaft part and including a protruding grip forming part which is configured to form the grip part to a portion of the container by pressurizing a portion of the preform that is expanded during the blow molding; and a piston member configured to move forward toward the cavity to thus press and rotate the link member, thereby moving the grip forming part from a standby position to a pressurizing position, wherein the grip forming part of the link member has:

a pressurizing surface configured to pressurize the portion of the preform that is expanded during the blow molding; and a contact surface configured to come into contact with the piston member, wherein the piston member has a pressing surface that comes into contact with the contact surface and presses the grip forming part toward an inside of the cavity when moving the pressurizing surface of the grip forming part from the standby position to the pressurizing position, and wherein the pressurizing surface is arranged at an opposite side of the contact surface of the grip forming part with respect to a moving direction of the piston member.

According to the above configuration, the pressurizing surface is arranged at the opposite side of the contact surface with respect to the moving direction of the piston member. For this reason, a place at which force is applied to the link member during the blow molding is the pressurizing surface to which a force of blow air for expanding the preform is applied and the contact surface to which a force for rotating the link member is applied. Accordingly, the force that is applied to the link member during the blow molding is concentrated on the grip forming part and a load that is applied to a longitudinal part or the shaft part of the link member can be reduced, so that it is possible to suppress the damage or failure of the link member and the shaft part.

Also, in the mold of the present invention, when moving the pressurizing surface of the grip forming part from the standby position to the pressurizing position, the pressing surface of the piston member may press the grip forming part toward the inside of the cavity while sliding relative to the contact surface.

According to the above configuration, during the blow molding, the pressing surface of the piston member moves the grip forming part from the standby position to the pressurizing position while sliding relative to the contact surface of the grip forming part. That is, it is possible to move the grip forming part (link member) by a necessary stroke even though a coupling member is not arranged between the link member having the grip forming part and the piston member. Accordingly, it is possible to completely eliminate a risk of a damage or failure of the coupling member and a maintenance operation thereof. Also, since the number of components is reduced, it is possible to save the cost of the mold (blow mold).

Also, in the mold of the present invention, it is preferable that an elastic member is provided between the link member and a cavity mold, and the link member is arranged at the standby position by the elastic member while the blow molding is not performed.

According to the above configuration, while the blow molding is not performed, the link member is arranged at the standby position by the elastic member, so that the grip forming part is suppressed from unnecessarily protruding into the cavity of the mold. Also, during the blow molding, it is possible to buffer a force of irregular directions, which is applied to the link member by the blow air, by the elastic member.

Also, a blow molding apparatus of the present invention includes:

the above-described mold, and a blow apparatus configured to manufacture the container having the grip part by using the mold.

According to the above configuration, it is possible to provide the blow molding apparatus in which a damage or failure is difficult to occur.

Also, a blow molding method of the present invention includes:

a step of preparing a preform;

a step of arranging the preform in the cavity of the above-described mold, and a blowing step of blowing the preform arranged in the mold, thereby manufacturing the container having the grip part.

According to the above method, it is possible to provide the blow molding method in which a damage or failure is difficult to occur in the mold or apparatus.

Advantageous Effects of Invention

According to the present invention, it is possible to provide the mold, the blow molding apparatus, and the blow molding method in which a damage or failure is difficult to occur.

BRIEF DESCRIPTION OF DRAWINGS

In FIG. 1, (a) is a side view of a resin container formed by blow molding, (b)) is a front view of the resin container, (c) is a rear view of the resin container, and (d) is a sectional view taken along a line A-A of (a) of FIG. 1.

In FIG. 7, (a) and (b) depict an example of a link member of a reference example.

DETAILED DESCRIPTION OF PREFERRED EMBODIMENTS

Hereinafter, an example of an illustrative embodiment will be described with reference to the drawings.

Figure 1:
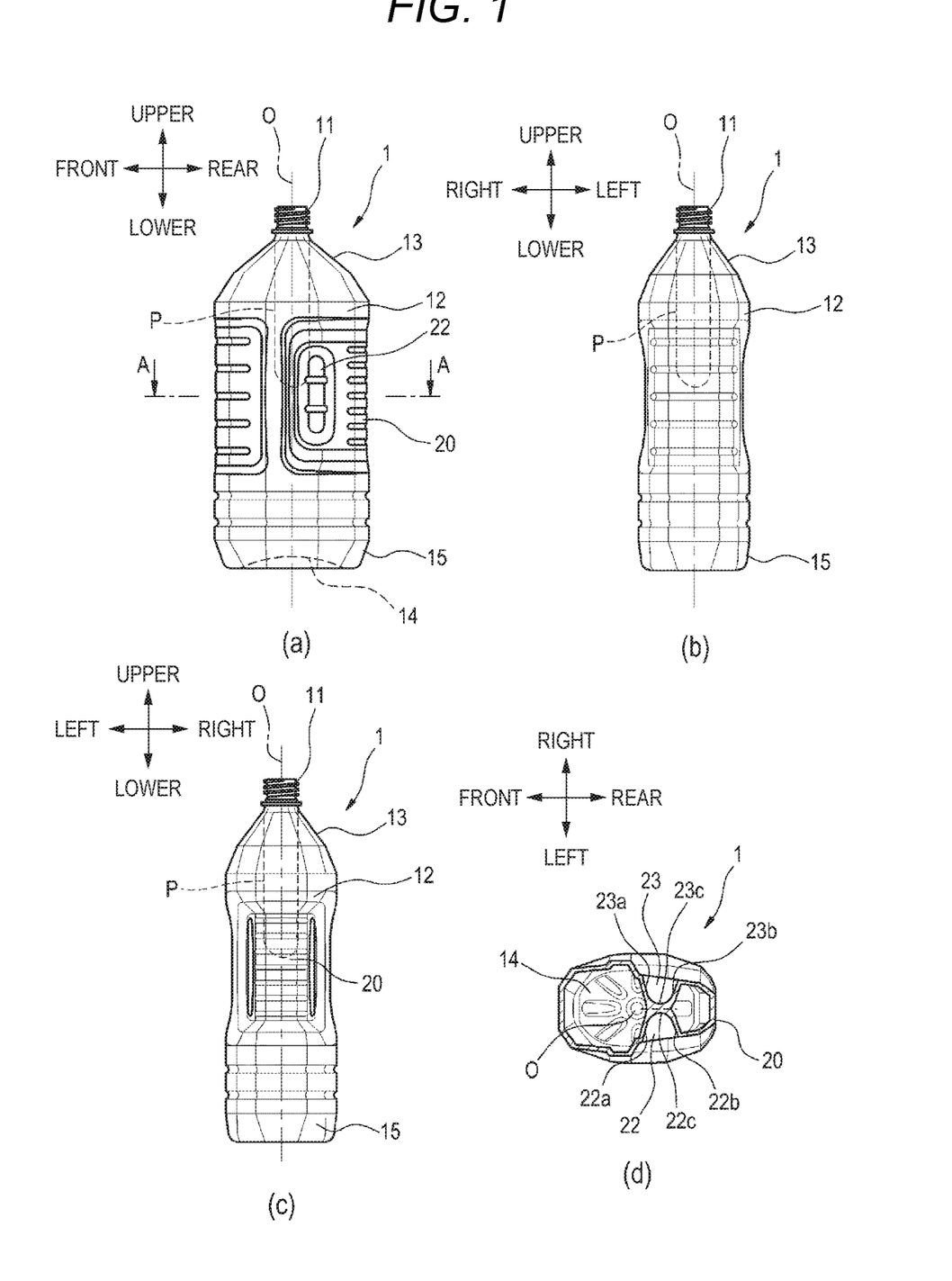

In FIG. 1, (a) to (d) depict a resin container 1 manufactured by a blow molding apparatus and a blow molding method relating to the present invention. The resin container 1 is formed of a resin material such as polyethylene terephthalate, and is used as a container for storing or transporting seasonings, beverages, alcoholic liquors and the like, for example. The resin container 1 has a neck part 11 having an opening formed at an upper end, a tubular body part 12, a shoulder part 13 configured to connect the neck part 11 and the body part 12 by enlarging diameters thereof, a bottom part 14 formed at a lower end, and a heel part 15 configured to connect the bottom part 14 and the body part 12 by enlarging diameters thereof. The body part 12 of the resin container 1 is provided with a grip part 20. Meanwhile, the broken line in (a) to (c) of FIG. 1 indicates a preform P that is used to manufacture the resin container 1. The preform P has a neck part having the same shape as the resin container 1, a substantially cylindrical body part, and a substantially semispherical bottom part, and has a bottomed tubular shape.

The grip part 20 is formed from the shoulder part 13 toward the lower of the body part 12 at a rear side of the resin container 1 in a height direction of the resin container 1. The grip part 20 is formed to continue to an outer peripheral surface of the resin container 1. The grip part 20 is formed to have an outer peripheral surface having substantially the same outer diameter as an outer peripheral surface of the body part 12 formed at upper and lower sides of the grip part 20 at a rear side of the body part 12. The grip part 20 is formed to have an outer peripheral surface more recessed to an inner side of the resin container 1 than the outer peripheral surface of the body part 12 at left and right side surfaces of the body part 12.

A front side (a central axis O-side of the resin container 1) of the grip part 20 is formed with a first concave part 22 on a left side surface and a second concave part 23 on a right side surface, which are recessed toward the inner side of the resin container 1 and face each other. The first concave part 22 and the second concave part 23 are provided as a concave part for grip when gripping the grip part 20, and are formed at positons that are substantially flush with the grip part 20.

The first concave part 22 has a front surface part 22a and a rear surface part 22b, which are inclined from one side surface of the resin container 1 toward the inner side of the resin container 1, and a bottom part 22c formed between the front surface part 22a and the rear surface part 22b. The second concave part 23 has a front surface part 23a and a rear surface part 23b, which are inclined from an opposite side surface to the one side surface of the resin container 1 toward the inner side of the resin container 1, and a bottom part 23c formed between the front surface part 23a and the rear surface part 23b. The first concave part 22 and the second concave part 23 are formed so that the bottom part 22c and the bottom part 23c face each other. The rear surface part 22b of the first concave part 22 and the rear surface part 23b of the second concave part 23 define an outer peripheral surface of a front side of the grip part 20. Here, in (d) of FIG. 1, the bottom part 22c and the bottom part 23c are welded on the opposing surfaces thereof (refer to the broken line). However, the bottom part 22c and the bottom part 23 may be separated and in contact with each other at the opposing surfaces thereof.

Subsequently, a blow molding apparatus for manufacturing the resin container 1 is described with reference to FIGS. 2 to 5.

Figure 2:
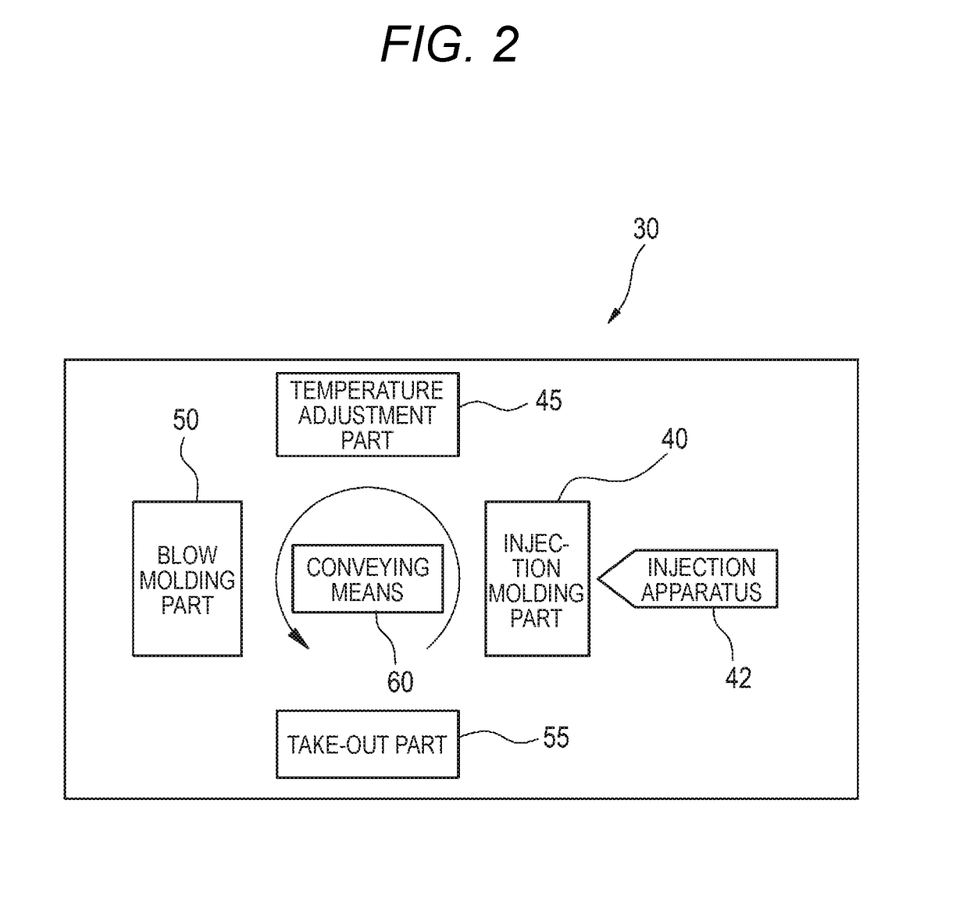
FIG. 2 is a block diagram of a blow molding apparatus relating to the present invention.

As shown in FIG. 2, a blow molding apparatus 30 includes an injection molding part 40 for manufacturing a preform, and a temperature adjustment part 45 for adjusting a temperature of the manufactured preform. The injection molding part 40 is connected with an injection apparatus 42 configured to supply a resin material, which is a source material. Also, the blow molding apparatus 30 includes a blow molding part (an example of the blow apparatus) 50 for blowing the preform to manufacture the resin container 1 having the grip part 20 and a take-out part 55 for taking out the manufactured resin container 1.

The injection molding part 40, the temperature adjustment part 45, the blow molding part 50 and the take-out part 55 are provided at positions rotated by predetermined angles (90°, in this example) about conveying means 60. The conveying means 60 is configured by a rotating plate and the like. A molded product of which the neck part 11 is supported by a neck mold mounted to the rotating plate is conveyed to each part in association with rotation of the rotating plate.

The injection molding part 40 includes an injection cavity mold, an injection core mold, a neck mold and the like, which are not shown. A resin material is caused to flow from the injection apparatus 42 into a preform-shaped space, which is formed as the molds are mold-clamped, so that a bottomed tubular preform is manufactured.

The temperature adjustment part 45 is configured to heat and adjust a temperature of the preform P manufactured with the injection molding part 40 to a temperature suitable for stretching blowing. Here, the temperature adjustment part 45 may be any type of a temperature adjustment pot type, an infrared heater type, a RED type and an electromagnetic heating type.

The take-out part 55 is configured to take out the resin container 1 by opening the neck part 11 of the resin container 1 manufactured in the blow molding part 50 from the neck mold.

Figure 3:
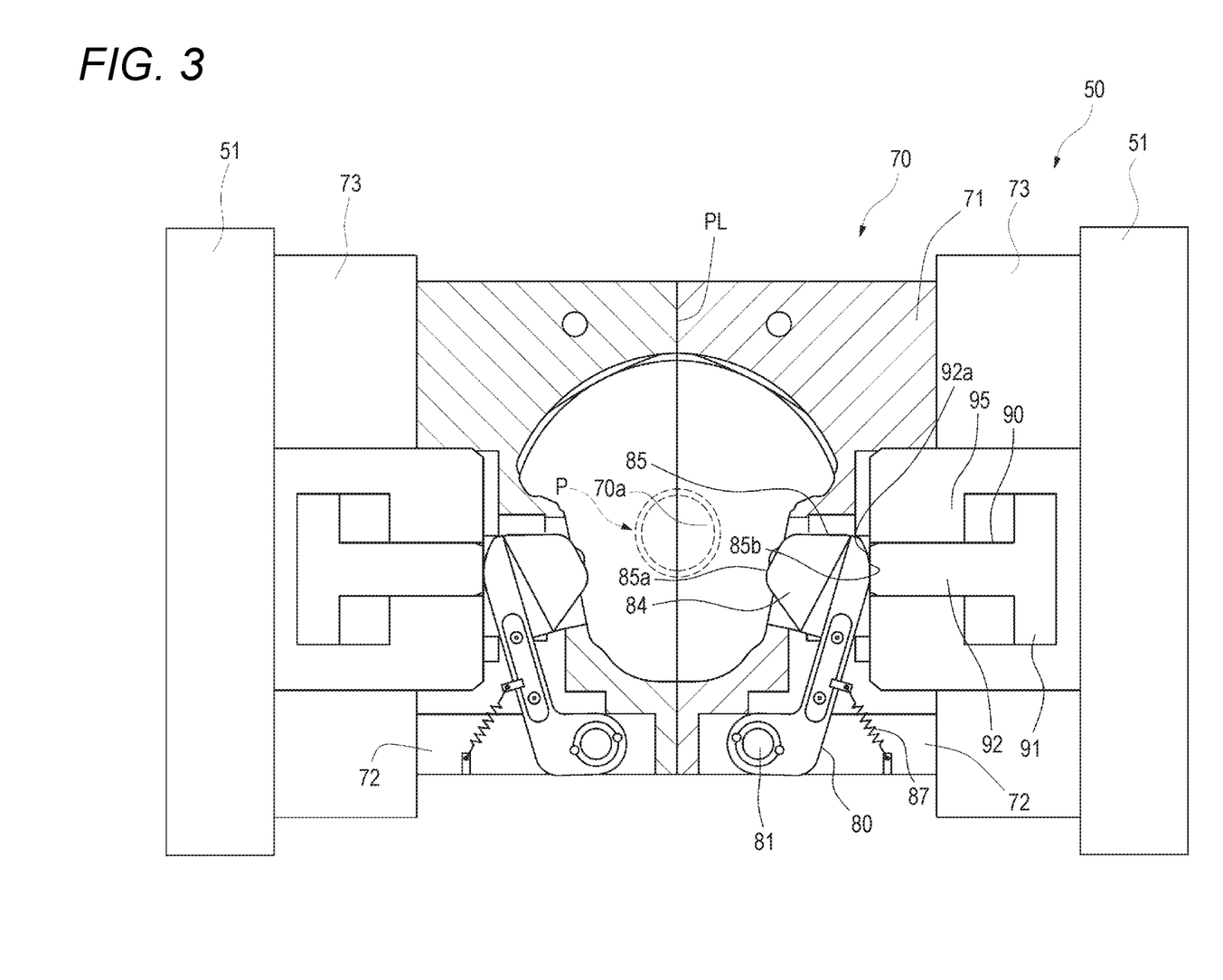
FIG. 3 is a cross-sectional view of a blow molding mold of a blow molding apparatus, depicting a step of blow molding.
Figure 4:
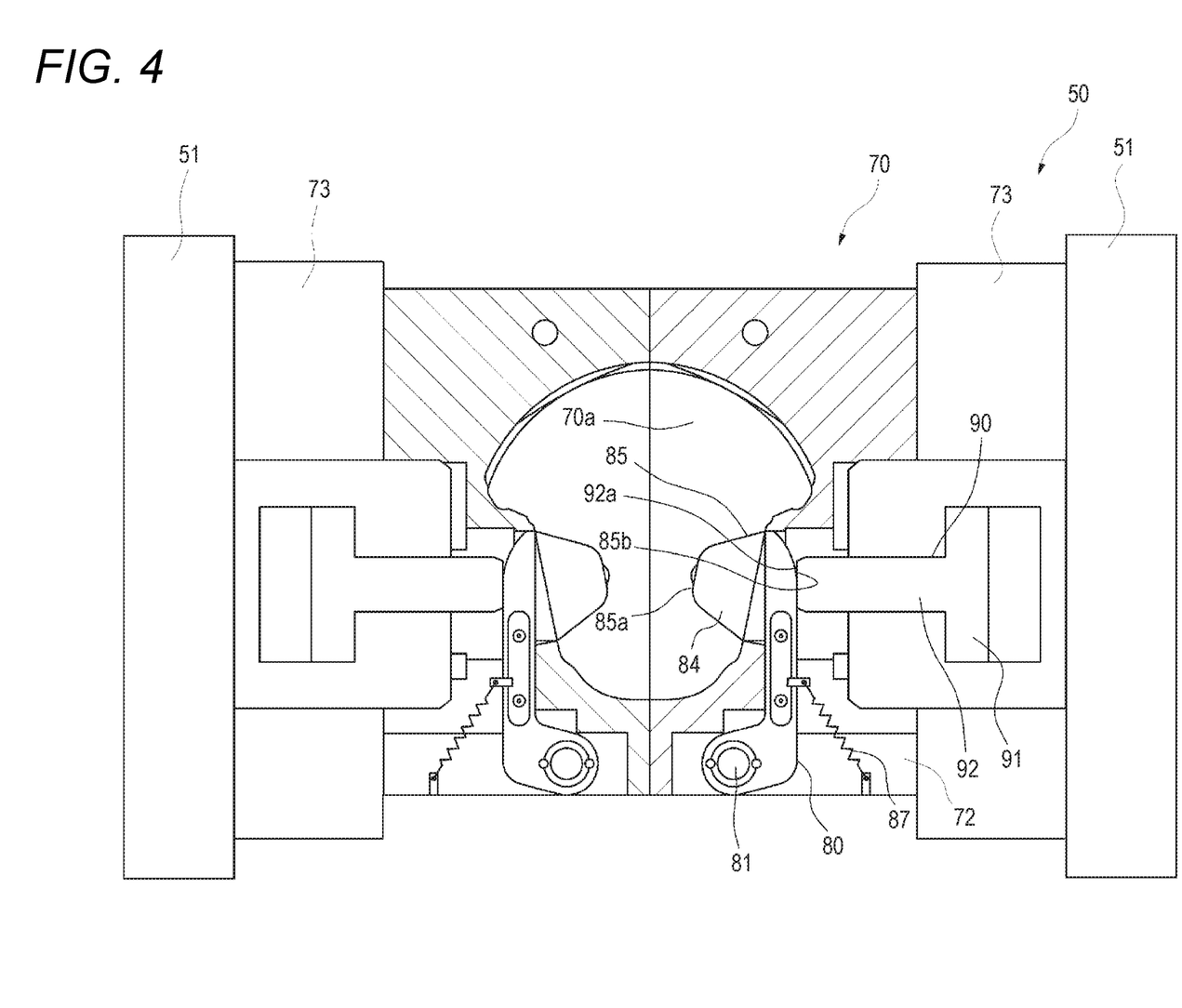
FIG. 4 is a cross-sectional view of the blow molding mold of the blow molding apparatus, depicting another step of the blow molding.

As shown in FIGS. 3 and 4, the blow molding part 50 includes a blow cavity mold 70 having two split molds 71, link members 80 for forming the grip part 20, and piston members 90 configured to press the link members 80. The split mold 71 is fixed to a blow base 73 on a surface on which the piston member 90 is provided, and the blow base 73 is coupled to a mold clamping device 51 to be openable and closable. Although not shown, a lower part of the blow cavity mold 70 is provided with a bottom mold and an upper part of the blow cavity mold 70 is provided with a blow core mold to be vertically moveable. In the meantime, a broken line at a substantially center position of the blow cavity mold 70 indicates the preform P before the blow molding.

The blow cavity mold 70 is configured to accommodate therein the injection-molded preform P, and to define an outer peripheral surface of the preform P (the resin container 1) to be subjected to the blow molding.

The link member 80 is provided to each of the split molds 71 of the blow cavity mold 70 so that it can rotate about a shaft part 81. Specifically, a recess part (concave part) 72 is formed on a side surface of the split mold 71 perpendicular to a parting line (PL), and the shaft part 81 for pivotally supporting the link member 80 is provided at a part closer to the parting line than a center of the recess part 72. When the preform P is subjected to the blow molding, the link member 80 can rotate from a standby position as shown in FIG. 3 at which the link member is distant from a center of a cavity (space) 70a of the blow cavity mold 70 to a pressurizing position as shown in FIG. 4 at which the link member comes close to the center of the cavity 70a. An elastic member (for example, a coil spring such as tension spring) 87 is provided between the link member 80 and the split mold 71 of the blow cavity mold, so that while the blow molding is not performed, the link member 80 is arranged at the standby position by an elastic force of the elastic member 87.

Figure 5:
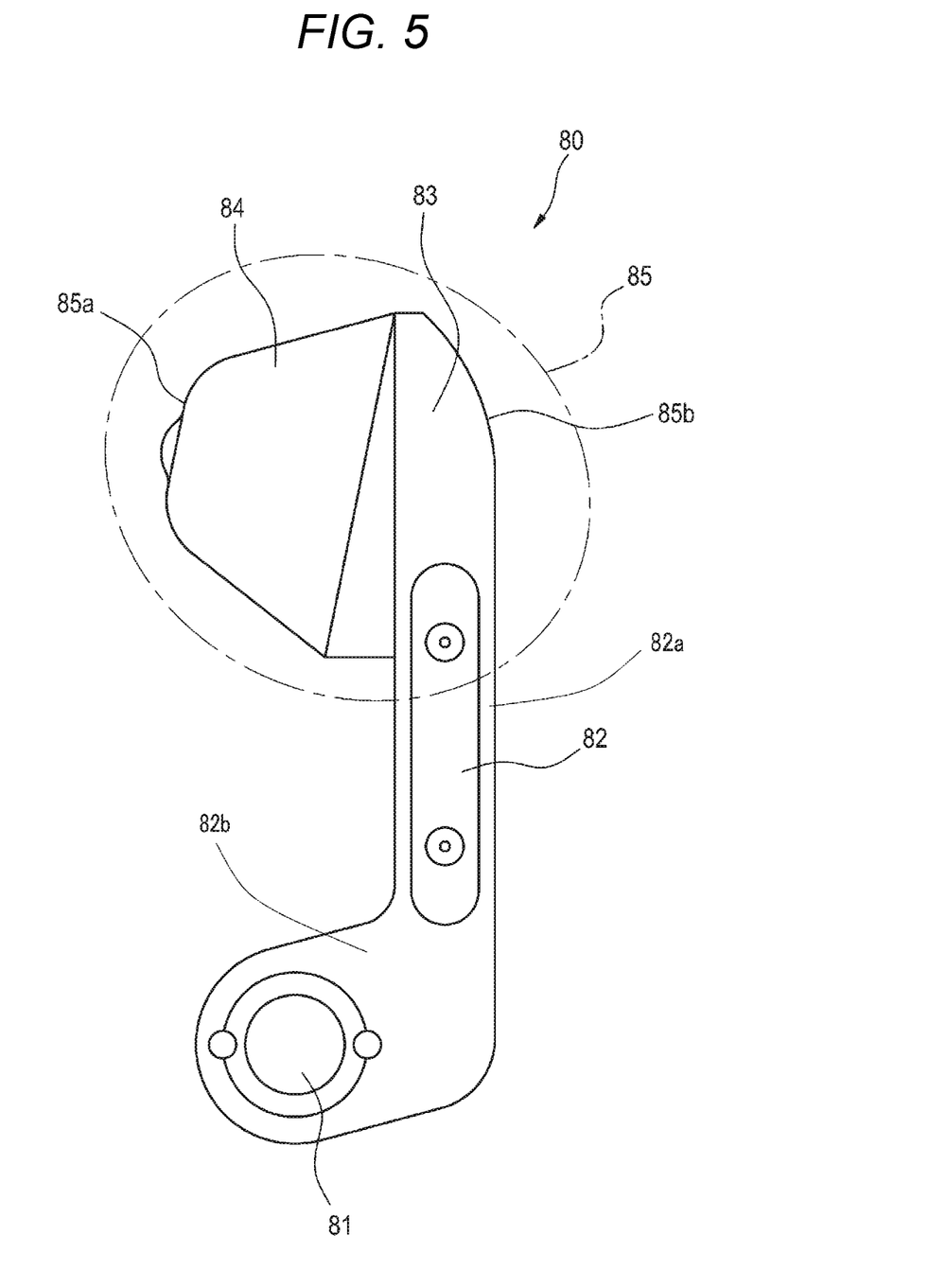
FIG. 5 depicts a link member of a blow molding part.

As shown in FIG. 5, the link member 80 has a long link main body part 82 having a substantially L-shape and a mold insert 84 fixed to one end portion (link end portion) 83 of the link main body part 82. An end portion of the link member 80, which is opposite to the link end portion 83 having the mold insert 84 fixed thereto, is configured as the shaft part 81. In the illustrative embodiment, the link end portion 83 and the mold insert 84 are collectively referred to as a grip forming part 85 of the link member 80. The link member 80 is configured to pressurize a portion of the preform P, which is expanded during the blow molding, by the protruding grip forming part 85, thereby forming the grip part 20 at a portion of the resin container 1. Also, in the illustrative embodiment, in order to save a space of the blow cavity mold 70, the mold insert 84 is provided at a long side part 82a of the link member 80 having a substantially L-shape, and the shaft part 81 is provided at a short side part 82b.

The grip forming part 85 has a pressurizing surface 85a configured to pressurize the preform P and a contact surface 85b configured to come into contact with the piston member 90 when pressed by the piston member 90. The pressurizing surface 85a of the grip forming part 85 is arranged at an opposite side to the contact surface 85b of the grip forming part 85 with respect to a moving direction of the piston member 90. When the link member 80 is located at the standby position, the pressurizing surface 85a is arranged on substantially the same surface as an inner wall surface of the cavity 70a (refer to FIG. 3), and when the link member 80 is located at the pressurizing position, the pressurizing surface 85a is arranged in the cavity 70a (refer to FIG. 4).

As shown in FIGS. 3 and 4, the piston member 90 is arranged in a tubular cylinder 95 mounted to the blow cavity mold 70, and is configured to move forward and rearward with respect to the cavity 70a of the blow cavity mold 70. The piston member 90 has a piston base 91 configured to slide in the cylinder 95 and to move forward and rearward with respect to the cavity 70a, and a piston rod 92 extending from the piston base 91 toward the cavity 70a.

A leading end face of the piston rod 92 is formed as a pressing surface 92a configured to contact the contact surface 85b of the grip forming part 85 and to press the grip forming part 85. That is, the piston rod 92 and the grip forming part 85 are not coupled to each other by any coupling member, and are instead configured so that the leading end face of the piston rod 92 is just supported in a non-coupling manner to the contact surface 85b of the grip forming part 85 rotated in a direction of getting away from the center of the cavity 70a by the elastic force of the elastic member 87. When the pressing surface 92a presses the grip forming part 85 to move the pressurizing surface 85a of the grip forming part 85 from the standby position to the pressurizing position, the pressing surface 92a changes a contact position while sliding relative to the contact surface 85b of the grip forming part 85, thereby pressing the grip forming part 85 toward an inside of the cavity 70a.

Here, in the blow molding part 50, only one half split mold 71 of the blow cavity mold 70 has been described. However, the other split mold 71 has also the similar configuration.

Figure 6:
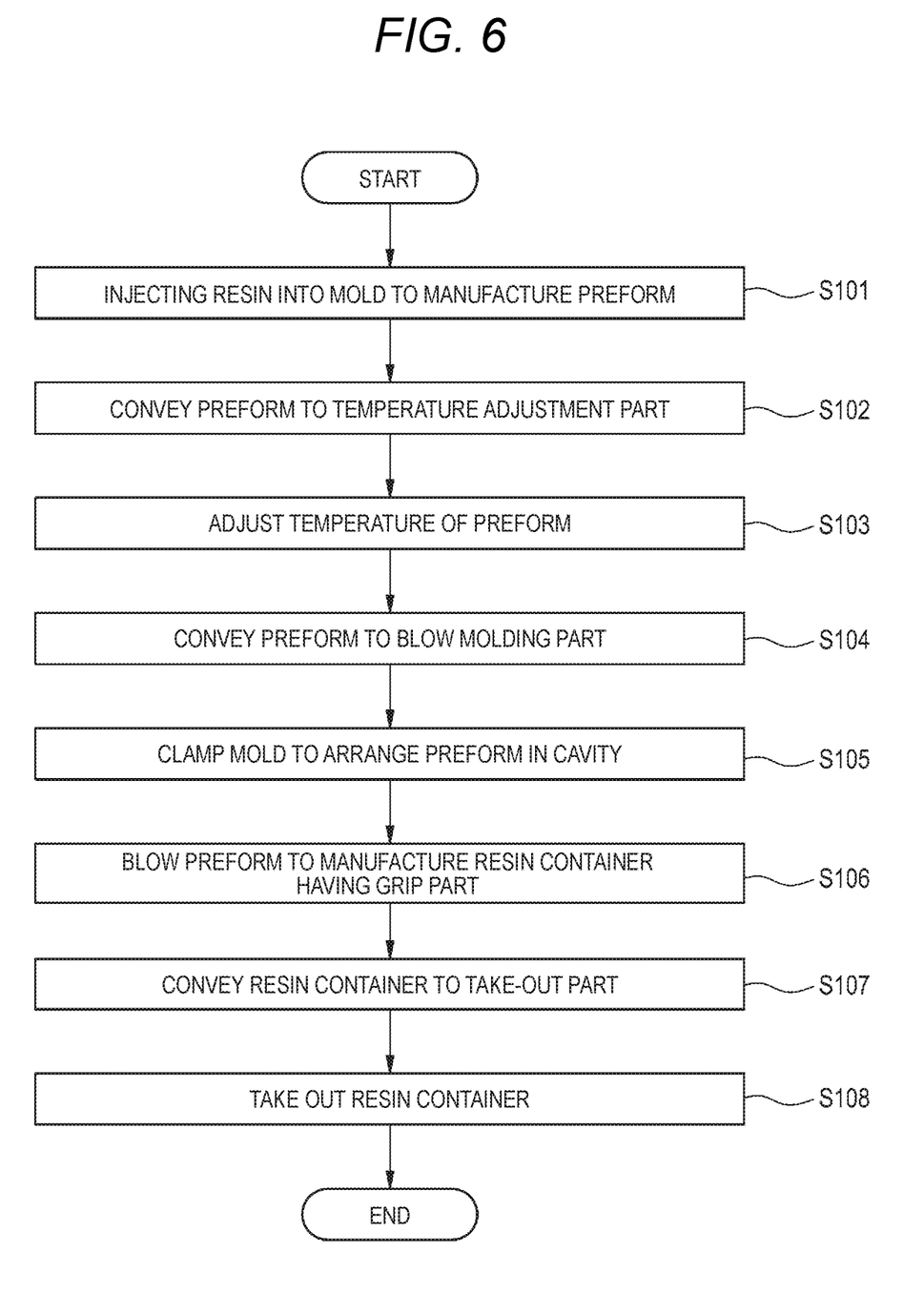
FIG. 6 is a flowchart depicting a manufacturing sequence of the resin container.

Subsequently, a blow molding method of the resin container 1 by using the blow molding apparatus 30 is described with reference to FIG. 6.

First, in the injection molding part 40, the bottomed tubular preform P is manufactured by mold-clamping the injection core mold and the injection cavity mold to the neck mold and injecting a resin material from the injection apparatus 42 into the mold (step S101).

Then, the injection core mold is retreated to mold-open the injection cavity mold, and the preform P is conveyed to the temperature adjustment part 45 in a state where the neck part of the preform P is held by the neck mold (step S102).

In the temperature adjustment part 45, the preform P is inserted in the temperature adjustment pot, for example, and a temperature of the preform P is adjusted to a temperature suitable for stretching (step S103).

Next, the preform P is taken out from the temperature adjustment pot, and is conveyed to the blow molding part 50 (step S104).

In the blow molding part 50, the blow core mold is inserted into the preform P held by the neck mold, the blow cavity mold 70 is mold-clamped and the bottom mold is mounted, so that the preform P is arranged in the cavity 70*a* (step S105).

The blow air is introduced into the preform P from the blow core mold to blow-mold the preform P into a shape of the cavity 70*a*. In this case, in a state where the preform is expanded to some extent by the introduced blow air, the piston base 91 of the piston member 90 provided to the split mold 71 is moved forward toward the cavity 70*a*. The piston base 91 is moved forward, so that the pressing surface 92*a* of the piston rod 92 comes into contact with the contact surface 85*b* of the grip forming part 85 and presses the grip forming part 85 toward the inside of the cavity 70*a*. Thereby, the link member 80 is rotated, so that the pressurizing surface 85*a* of the grip forming part 85 is moved from the standby position (refer to FIG. 3) to the pressurizing position (refer to FIG. 4). In the meantime, the similar operation is also performed in the other split mold 71 of the blow molding part 50.

By moving the grip forming parts 85 in a direction of coming close to each other from the blow cavity mold 70, the first concave part 22 and the second concave part 23 are formed to the body part 12 of the blown preform P (resin container 1). The first concave part 22 and the second concave part 23 are formed, so that the grip part 20 of which the outer peripheral surface of the front side is defined by the rear surface part 22*b* of the first concave part 22 and the rear surface part 23*b* of the second concave part 23 is formed (step S106), Next, the blow cavity mold 70, the blow core mold and the bottom mold are mold-opened, and the resin container 1 blow-molded is conveyed while being held by the neck mold to the take-out part 55 (step S107).

Finally, in the take-out part 55, the neck part 11 of the resin container 1 is released from the neck mold, and the resin container 1 having the grip part 20 formed thereto is taken out from the blow molding apparatus 30, so that the manufacturing of the resin container 1 is completed (step S108).

Here, in the step of molding the resin container 1, the step of manufacturing the preform P (step S101) may be any step capable of preparing the preform P to be blow-molded, for example, a step of conveying the preform P manufactured at other place.

In the meantime, recently, the resin container having the grip part has become larger. When forming the grip part at the body part of the large resin container, it is necessary to largely and deeply form the body part with a concave part for finger-hooking, so as to improve the grip ability. In this case, in a blow molding tool for forming the resin container, a moveable mold insert is mounted so as to form a concave part for finger-hooking, in many cases.

Figure 7:
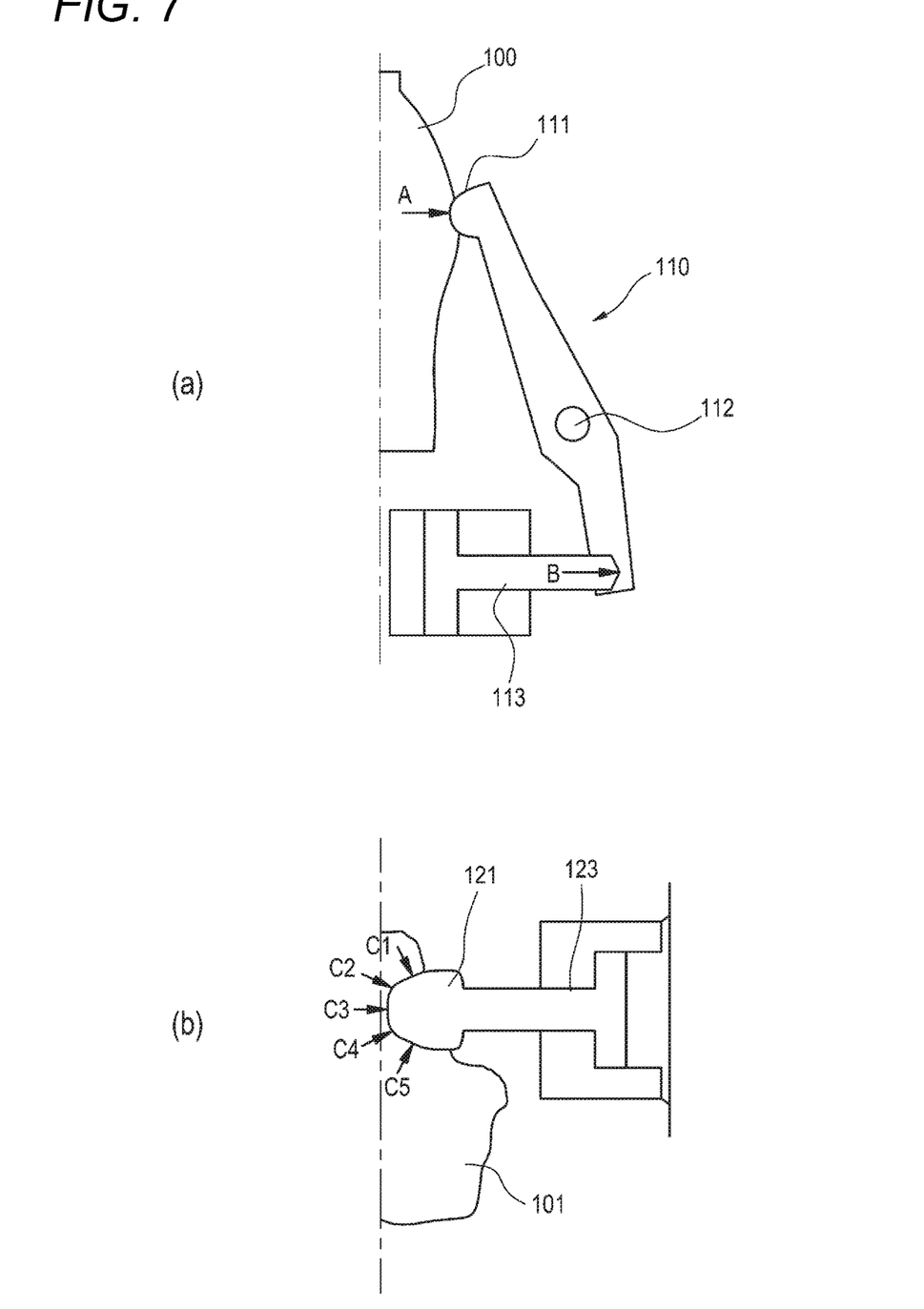

For example, in a configuration of a blow molding tool shown in (*a*) of FIG. 7 (WO2013/099753), one end of a link member 110 is provided with a mold insert 111 for forming a grip part, and the other end of the link member 110 is provided with a hydraulic cylinder 113 for rotating the link member 110 with a shaft part 112 being interposed therebetween. In this case, during the blow molding, a force of the blow air (an arrow A) for expanding a preform 100 is applied to the mold insert 111 provided at one end, and a force of the hydraulic cylinder (an arrow B) for rotating the link member 110 is applied to the other end. In this configuration, the force of the blow air and the force of the hydraulic cylinder are separately applied in the same direction to both sides of the link member 110 having the shaft part 112 interposed therebetween. Accordingly, defects such as damage or failure is likely to occur to the respective parts of the link member 110 including the mold insert 111 and the shaft part 112.

Also, for example, in a configuration of a blow molding tool shown in (*b*) of FIG. 7 (JP-A-2007-153366), a mold insert 121 is coaxially coupled integrally with a hydraulic cylinder 123. In this case, during the blow molding, the force of the blow air for expanding the preform 101 has an influence on the mold insert 121 in irregular directions, as shown with arrows C1, C2, . . . , C5. For this reason, the force of the blow air may act on the advancing movement of the hydraulic cylinder 123 so that it deviates (oscillates) in a vertical direction or in a right and left direction. As a result, the hydraulic cylinder 123 frictions a peripheral part, so that defects such as damage or failure occurs.

In contrast, according to the blow molding apparatus 30 having the mold and the blow molding method of the illustrative embodiment, the pressurizing surface 85*a* of the grip forming part 85 of the link member 80 is arranged at the opposite side of the contact surface 85*b* of the grip forming part 85 with respect to the moving direction of the piston member 90. For this reason, a place at which force is applied to the link member 80 during the blow molding is the pressurizing surface 85*a* facing toward the cavity 70*a*, to which the force of the blow air for expanding the preform P is applied, and the contact surface 85*b* facing toward the piston member 90, to which the force for rotating the link member 80 (the force from the piston member 90) is applied. Accordingly, most of the force that is applied to the link member 80 during the blow molding is concentrated on the grip forming part 85, and a load that is applied to the link main body part 82 or the shaft part 81 of the link member 80 can be reduced, so that it is possible to suppress the damage or failure of the link member 80.

Also, the grip forming part 85 of the link member 80 and the piston member 90 are independent members and are not coupled to each other. For this reason, during the blow molding, the pressing surface 92*a* of the piston member 90 changes a contact position and presses the grip forming part while sliding relative to the contact surface 85*b* of the grip forming part 85, thereby moving the grip forming part 85 from the standby position to the pressurizing position. That is, it is possible to move the grip forming part (link member) in conformity to a necessary stroke even though a coupling member is not arranged between the link member 80 having the grip forming part and the piston member 90. Accordingly, it is possible to completely eliminate a risk of a damage or failure of the coupling member and a maintenance operation thereof. Also, since the number of components is reduced, it is possible to save the cost of the mold (blow mold).

Also, while the blow molding is not performed, the link member 80 is arranged at the standby position by the elastic member 87. For this reason, the grip forming part 85 is suppressed from unnecessarily protruding into the cavity 70*a* of the blow cavity mold 70, at times other than the forming of the grip. Also, during the blow molding, it is possible to absorb and buffer the force of the irregular directions, which is applied to the grip forming part 85 of the link member 80 by the blow air, by the elasticity of the elastic member 87 provided to the shaft part 81, thereby suppressing the rattling of the link member 80.

In the meantime, the present invention is not limited to the above illustrative embodiment and can be appropriately modified and improved. In addition, the materials, shapes, sizes, numerical values, forms, numbers, arrangement places and the like of the respective constitutional elements of the illustrative embodiment are arbitrary and are not particularly limited inasmuch as the present invention can be implemented.

Figure 8:
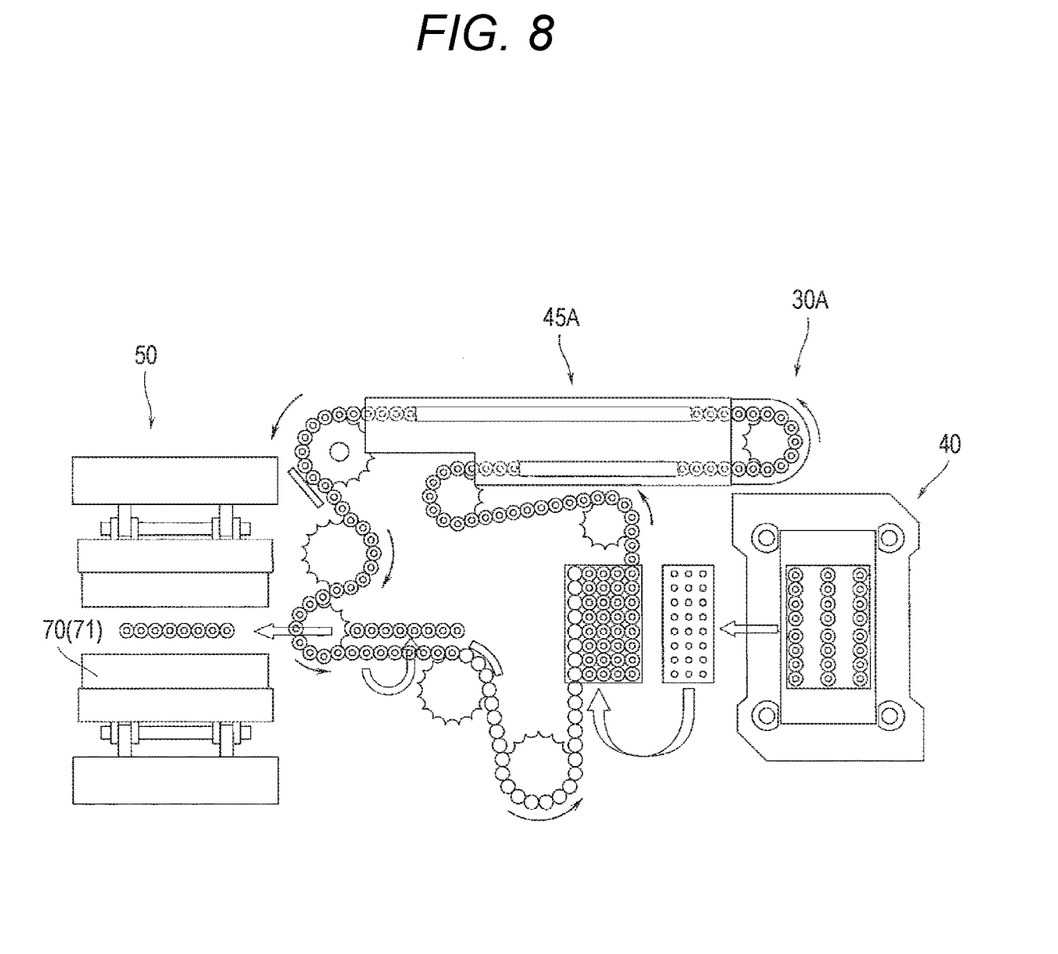
FIG. 8 depicts a modified embodiment.

In the illustrative embodiment, the conveying means is configured by the rotating plate. However, the present invention is not limited to the example. For example, as shown in FIG. 8, a blow molding apparatus 30A may have a configuration where the injection molding part 40 and the blow molding part 50 are connected using a conveyor rail. The conveyor rail is configured to continuously convey a conveyance jig supporting the preform P in a loop shape, and a temperature adjustment part 45A (a heating part) may be provided on the way of a path of the conveyor rail (in the meantime, since a configuration of the blow molding apparatus 30A has been already known in WO2012/057016 filed by the applicant of this application, for example, only a brief description thereof is provided here). Also, in the blow molding part 50, a plurality of the blow cavity molds 70 may be aligned in a direction along the parting line within a length range of the mold clamping device 51.

Although the present invention has been described in detail with reference to the specific illustrative embodiment, it is obvious to one skilled in the art that a variety of changes and modifications can be made without departing from the spirit and scope of the present invention.

The subject application is based on Japanese Patent Application No. 2015-211770 filed on Oct. 28, 2015, the contents of which are incorporated herein by reference.

REFERENCE NUMERALS LIST

1: resin container
11: neck part
12: body part 12
20: grip part
22: first concave part
23: second concave part
30: blow molding apparatus
40: injection molding part
50: blow molding part (an example of the blow apparatus)
70: blow cavity mold
70a: cavity
80: link member
81: shaft part
82: link main body part
83: link end portion
84: mold insert
85: grip forming part
85a: pressurizing surface
85b: contact surface
87: elastic member
90: piston member
91: piston
92: piston rod
92a: pressing surface 92a
95: cylinder

The invention claimed is:

1. A mold for manufacturing a resin container having a grip part by inserting a bottomed tubular preform into a cavity and performing blow molding, the mold comprising:
a link member configured to be rotatable about a shaft part and including a protruding grip forming part which is configured to form the grip part to a portion of the container by pressurizing a portion of the preform that is expanded during the blow molding,
wherein an elastic member is provided between the link member and a cavity mold, and
wherein the link member is arranged at the standby position by the elastic member while the blow molding is not performed; and
a piston member configured to move forward toward the cavity to thus press and rotate the link member, thereby moving the grip forming part from a standby position to a pressurizing position,
wherein the grip forming part of the link member has:
a pressurizing surface configured to pressurize the portion of the preform that is expanded during the blow molding; and
a contact surface configured to come into contact with the piston member,
wherein the piston member has a pressing surface that comes into contact with the contact surface and presses the grip forming part toward an inside of the cavity when moving the pressurizing surface of the grip forming part from the standby position to the pressurizing position, and
wherein the pressurizing surface is arranged at an opposite side of the contact surface of the grip forming part with respect to a moving direction of the piston member.

2. The mold according to claim 1,
wherein, when moving the pressurizing surface of the grip forming part from the standby position to the pressurizing position, the pressing surface of the piston member presses the grip forming part toward the inside of the cavity while sliding relative to the contact surface.

3. A blow molding apparatus comprising:
the mold according to claim 1, and
a blow apparatus configured to manufacture the container having the grip part by using the mold.

4. A blow molding method comprising:
a step of preparing a preform;
a step of arranging the preform in the cavity of the mold according to claim 1, and
a blowing step of blowing the preform arranged in the mold, thereby manufacturing the container having the grip part.

* * * * *